(12) United States Patent
Manabe (10) Patent No.: US 6,374,050 B1
(45) Date of Patent: Apr. 16, 2002

(54) CAMERA

(75) Inventor: Mitsuo Manabe, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/524,557

(22) Filed: Mar. 13, 2000

(30) Foreign Application Priority Data

Mar. 15, 1999 (JP) ............................................. 11-069080

(51) Int. Cl.$^7$ ................................................ G03B 13/00
(52) U.S. Cl. ...................................... 396/106; 396/535
(58) Field of Search ................................ 396/512, 513, 396/439, 89, 121, 101, 111, 535, 541, 106, 538

(56) References Cited

U.S. PATENT DOCUMENTS 4,065,776 A * 12/1977 Harvey ........................ 396/101
5,634,143 A * 5/1997 Kitagawa et al. .............. 396/52
5,822,635 A * 10/1998 Omi et al. ................... 396/411
5,870,178 A * 2/1999 Egawa et al. ............... 356/3.03

* cited by examiner

Primary Examiner—David M. Gray
(74) Attorney, Agent, or Firm—Young & Thompson (57) ABSTRACT

In an APS camera, one of a light projecting part and an light receiving part of an autofocus device is arranged above a film cartridge chamber. The one of the light projecting part and the light receiving part has a recession at a bottom of a casing thereof. The camera is provided with a light-shielding door drive mechanism to open and close a light-shielding door of a film cartridge housed in the film cartridge chamber. At least a part of the light-shielding door drive mechanism is arranged between the film cartridge chamber and the recession of the one of the light projecting part and the light receiving part.

2 Claims, 8 Drawing Sheets

CAMERA

BACKGROUND OF THE INVENTION

1. Field of the Invention

This invention relates generally to a camera, more particularly to an Advanced Photo System (APS) camera having an autofocus (AF) device.

2. Description of Related Art

An APS camera is usually equipped with an autofocus device having a light projecting part and a light receiving part, which are located at both sides of an objective lens of a finder. The longer a base line length between the light projecting part and the light receiving part is, the more accurate the measurement of an object distance by the autofocus device is. However, if the camera is not designed well so as to have the long base line length, it will result in the camera that is bulky.

An APS film cartridge contains a 24 mm film, and is provided with a light-shielding door at a film feed aperture. Thus, the APS camera in particular has to be provided with a drive mechanism for opening and closing the light-shielding door of the APS film cartridge loaded in a film cartridge chamber of the camera. The light-shielding door drive mechanism must be arranged over the film cartridge chamber. In the conventional APS camera, the light projecting part and the light receiving part of the autofocus device are arranged aside the light-shielding door drive mechanism in order to keep the height of the camera short. Hence, an adequate base line length of the autofocus device is conventionally secured by lengthening the width of the camera.

SUMMARY OF THE INVENTION

It is therefore an object of the present invention to provide a camera in which the base line length of the autofocus device is enough without increasing the size of the camera.

The above object can be accomplished by providing a camera comprising: a camera body; a film cartridge chamber formed in the camera body, the film cartridge chamber housing a film cartridge provided with a light-shielding door; a film winding chamber formed in the camera body, the film winding chamber having a take-up spool winding a photographic film fed from the film cartridge housed in the film cartridge chamber; an autofocus device arranged in the camera body, the autofocus device having a light projecting part and a light receiving part to measure an object distance; and a light-shielding door drive mechanism which opens and closes a light-shielding door of the film cartridge housed in the film cartridge chamber, wherein: one of the light projecting part and the light receiving part of the autofocus device is arranged above the film cartridge chamber, the one of the light projecting part and the light receiving part having a recession formed at a bottom thereof; and at least a part of the light-shielding door drive mechanism is arranged between the film cartridge chamber and the recession of the one of the light projecting part and the light receiving part.

Alternatively, the above object can be accomplished by providing a camera comprising: a camera body; a film cartridge chamber formed in the camera body, the film cartridge chamber housing a film cartridge; a film winding chamber formed in the camera body, the film winding chamber having a take-up spool winding a photographic film fed from the film cartridge housed in the film cartridge chamber; an autofocus device arranged in the camera body, the autofocus device having two light receiving parts to measure an object distance; and a light-shielding door drive mechanism which opens and closes a light-shielding door of the film cartridge housed in the film cartridge chamber, wherein: one of the two light receiving parts of the autofocus device is arranged above the film cartridge chamber, the one of the two light receiving parts having a recession formed at a bottom thereof; and at least a part of the light-shielding door drive mechanism is arranged between the film cartridge chamber and the recession of the one of the two light receiving parts.

According to the present invention, one of the light projecting part and the light receiving part of the autofocus device is arranged above the film cartridge chamber, and the part of the light-shielding door drive mechanism is arranged between the film cartridge chamber and the recession formed at the bottom of the one of the light projecting part and the light receiving part.

Consequently, even if the light-shielding door drive mechanism and the light receiving part or the light projecting part of the autofocus device are arranged above the film cartridge chamber, the height of the camera body of the camera of the present invention is equal to the height of the comparative camera body in which only the light receiving part or the light projecting part of the autofocus device is arranged above the film cartridge chamber. Therefore, the height of the camera is reduced by the thickness of the light-shielding door drive mechanism.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
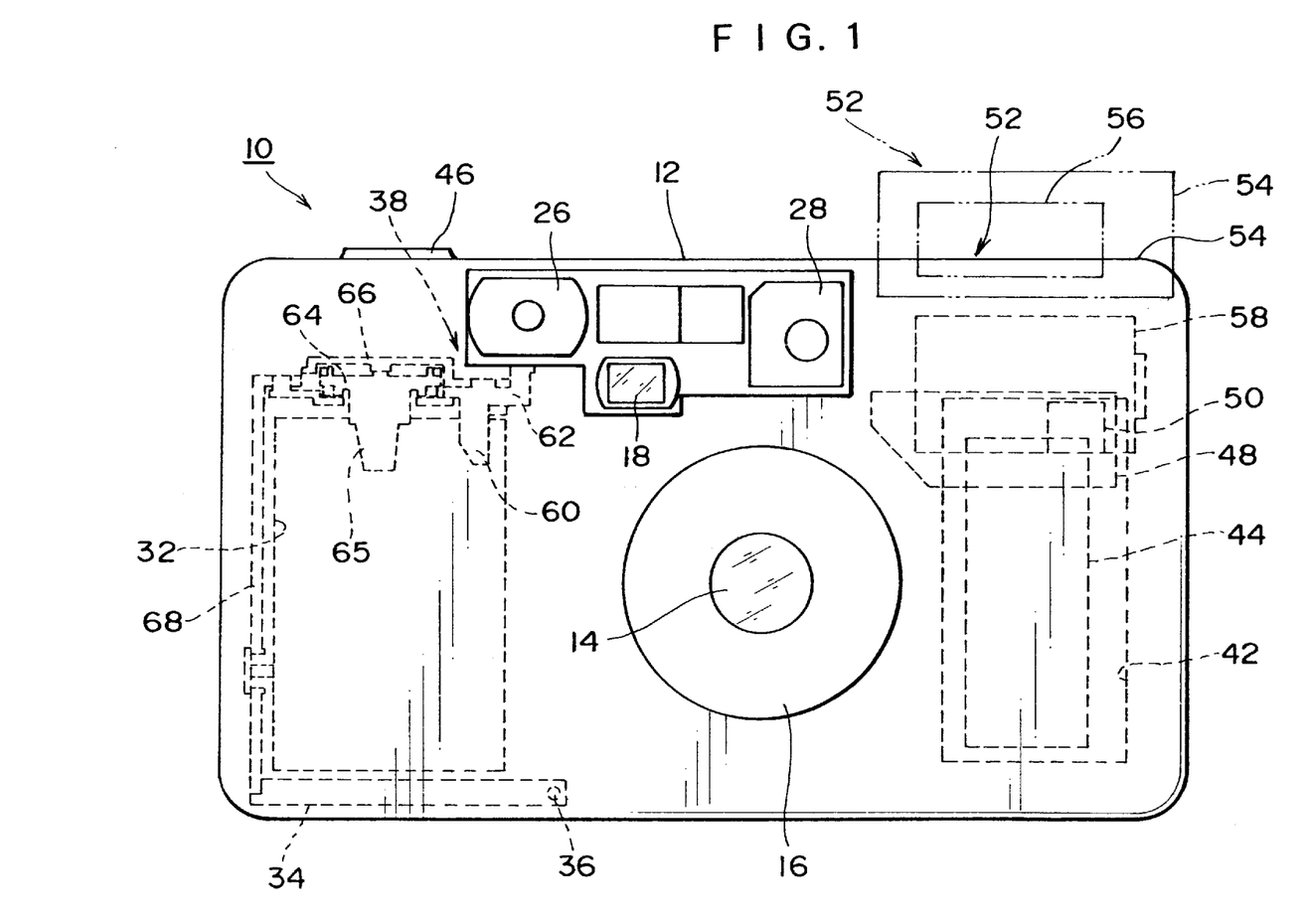
FIG. 1 is a front view showing an APS camera according to an embodiment of the present invention.
Figure 2:
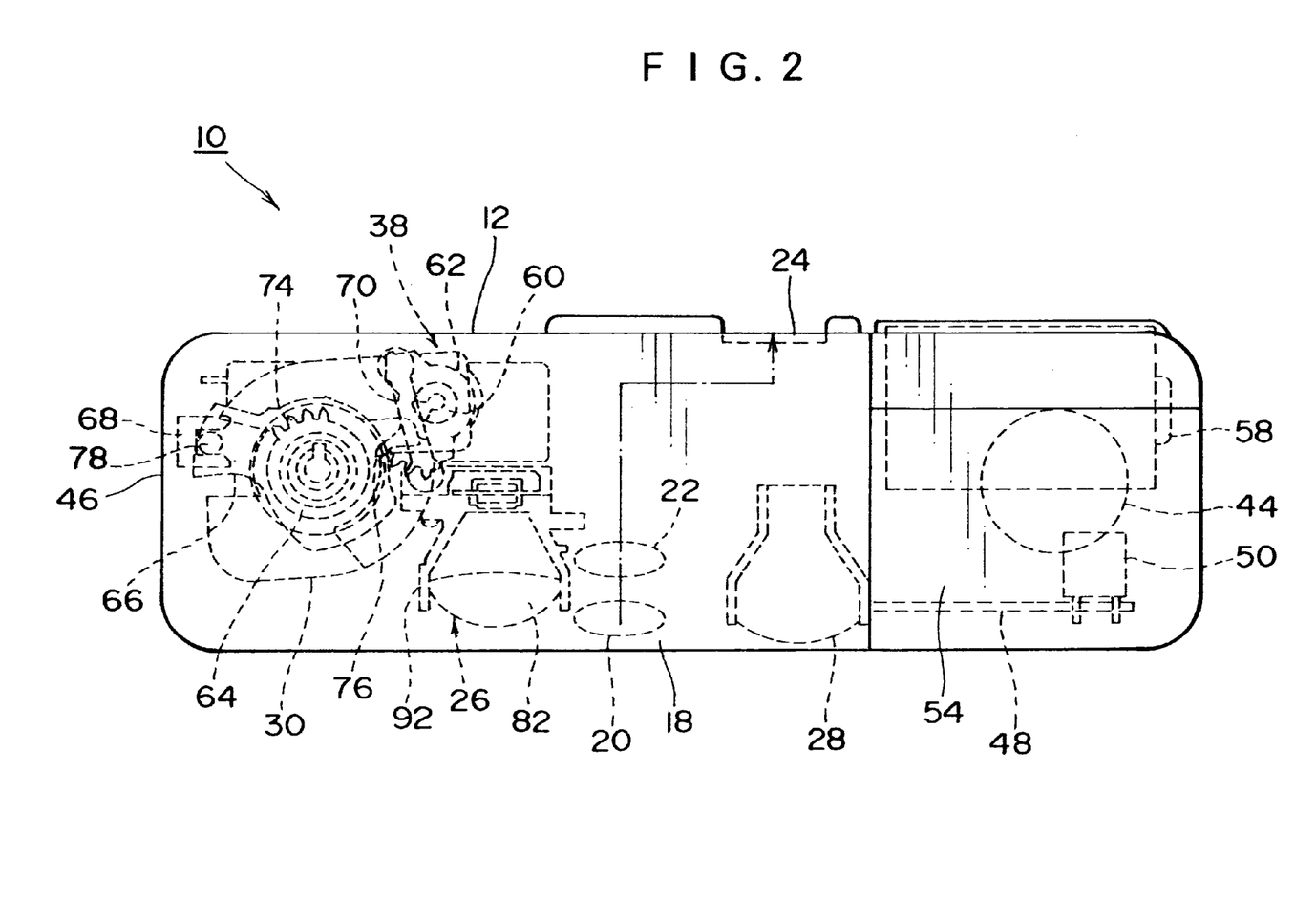
FIG. 2 is a plan view showing the APS camera in FIG. 1.
Figure 3:
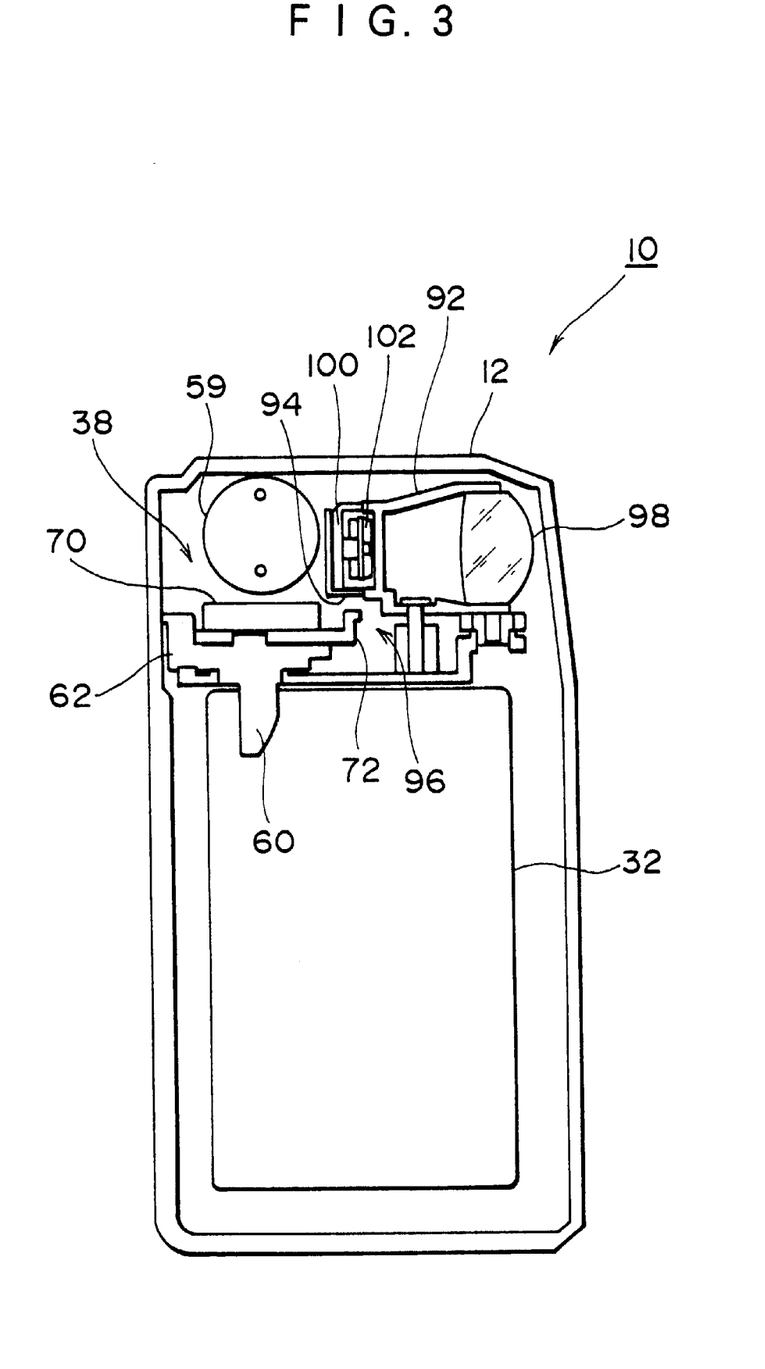
FIG. 3 is an inside view showing a principal part of the APS camera in FIG. 1.

FIG. 1 is a front view showing an APS camera 10 according to an embodiment of the present invention, FIG. 2 is a plan view showing the camera 10, and FIG. 3 is an inside view showing the principal part of the camera 10.

As shown in FIGS. 1 and 2, a camera body 12 of the camera 10 is shaped like a box that is long sideways, and a zoom lens barrel 16 including a taking lens 14 is provided at the center of the front of the camera 10 in FIG. 1. The zoom lens barrel 16 is a so-called collapsible zoom lens barrel, which is moved forward from a collapsing position within the camera body 12 to an initial position when a main power supply of the camera 10 is turned on. After moved forward, the zoom lens barrel 16 is zoomed by operating a zoom lever (not illustrated) provided in the camera 10 to thereby set a desired photographic magnification.

An objective part 18 of a finder is provided above the zoom lens barrel 16 of the camera body 12. As indicated by broken lines in FIG. 2, movable lenses 20, 22 are arranged in the objective part 18, and they are moved forward and backward along an optical axis of the finder in connection with the zooming of the zoom lens barrel 16. Thus, a subject image observed through an eyepiece 24 of the finder can be enlarged in a magnification corresponding to the photographic magnification of the zoom lens barrel 16.

As shown in FIG. 1, an AF light receiving part 26 is arranged at the left side of the finder objective part 18, and an AF light projecting part 28 is arranged at the right side of the finder objective part 18. A film cartridge chamber 32 for containing a film cartridge 30 indicated by broken lines in FIG. 2 is formed at the left side of the zoom lens barrel 16 below the AF light receiving part 26. A lid 34 for opening and closing the film cartridge chamber 32 is provided at the bottom of the film cartridge chamber 32 rotatably about a pin 36. The film cartridge 30 is loaded in and unloaded from the film cartridge chamber 32 by opening the lid 34.

Figure 4:
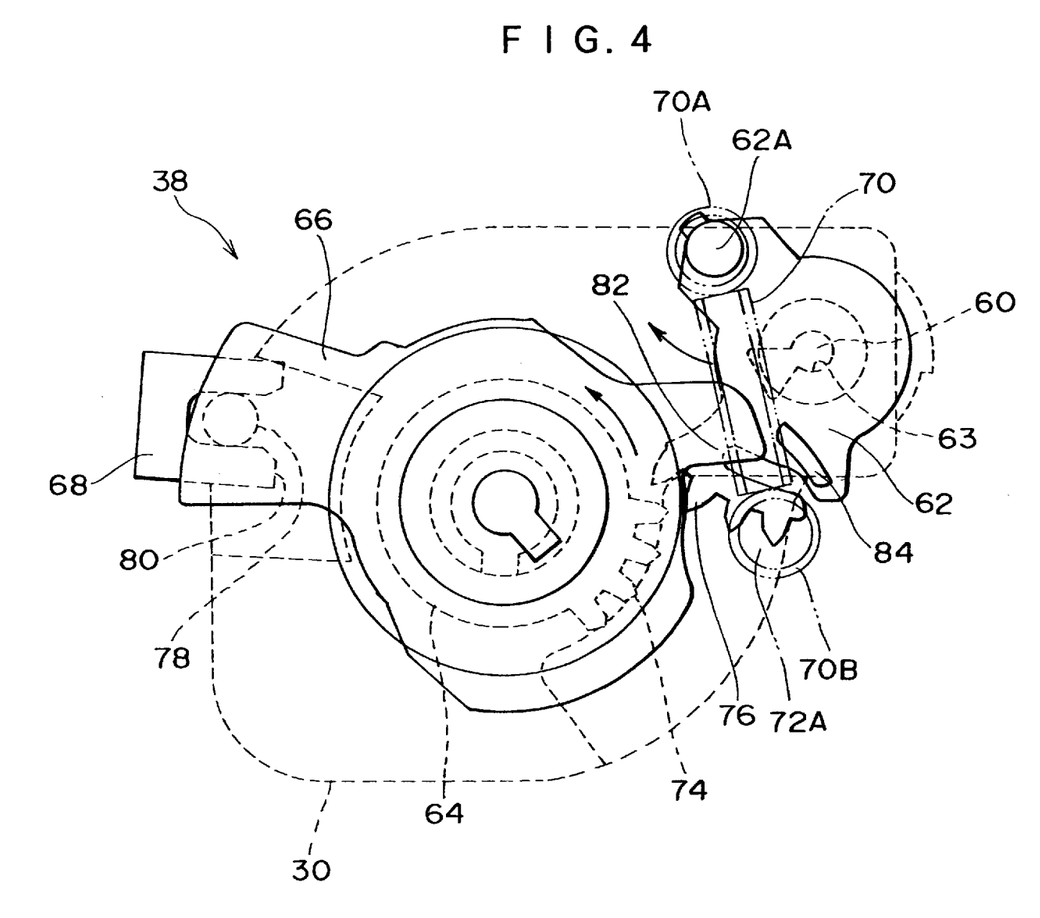
FIG. 4 is a plan view showing a light-shielding door drive mechanism in the APS camera in FIG. 1.
Figure 5:
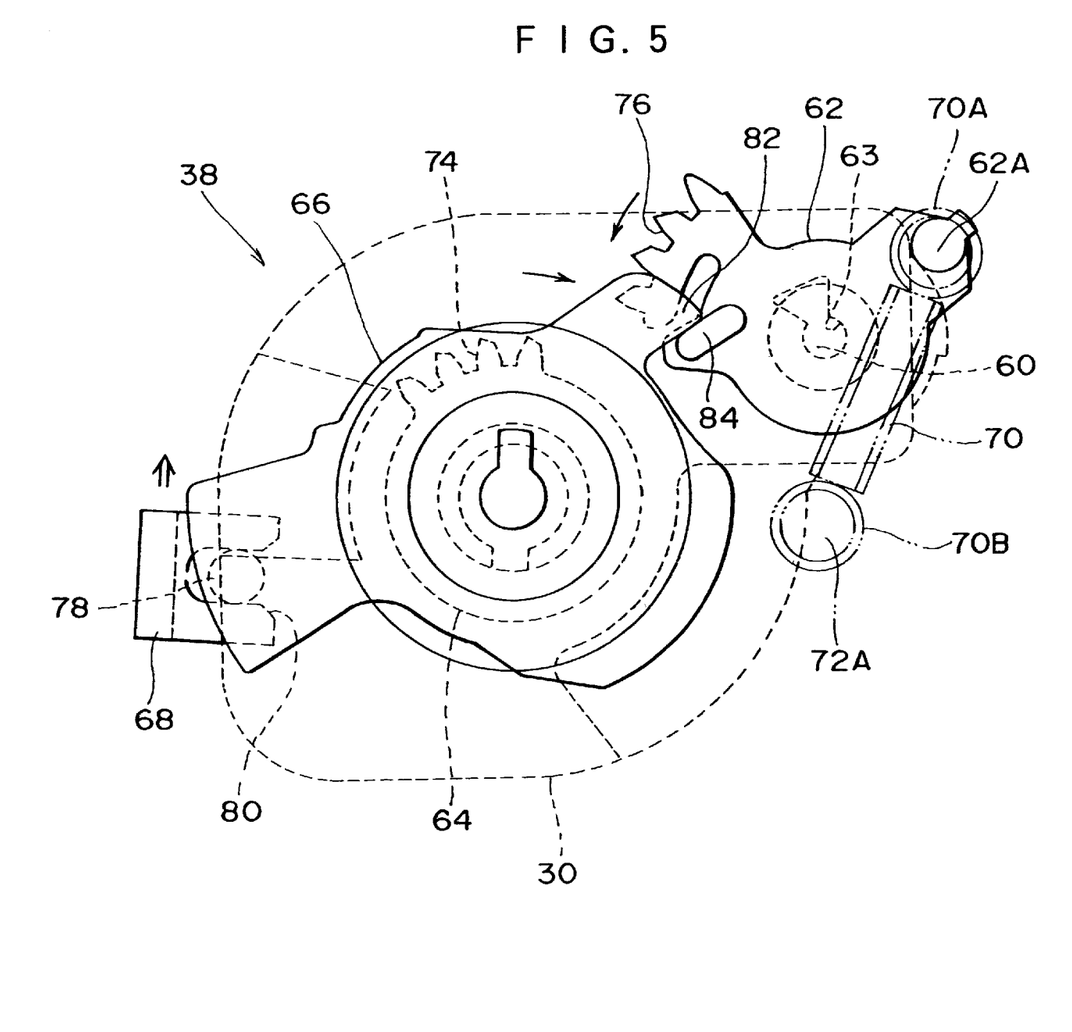
FIG. 5 is a plan view showing the light-shielding door drive mechanism in the APS camera in FIG. 1.
Figure 6:
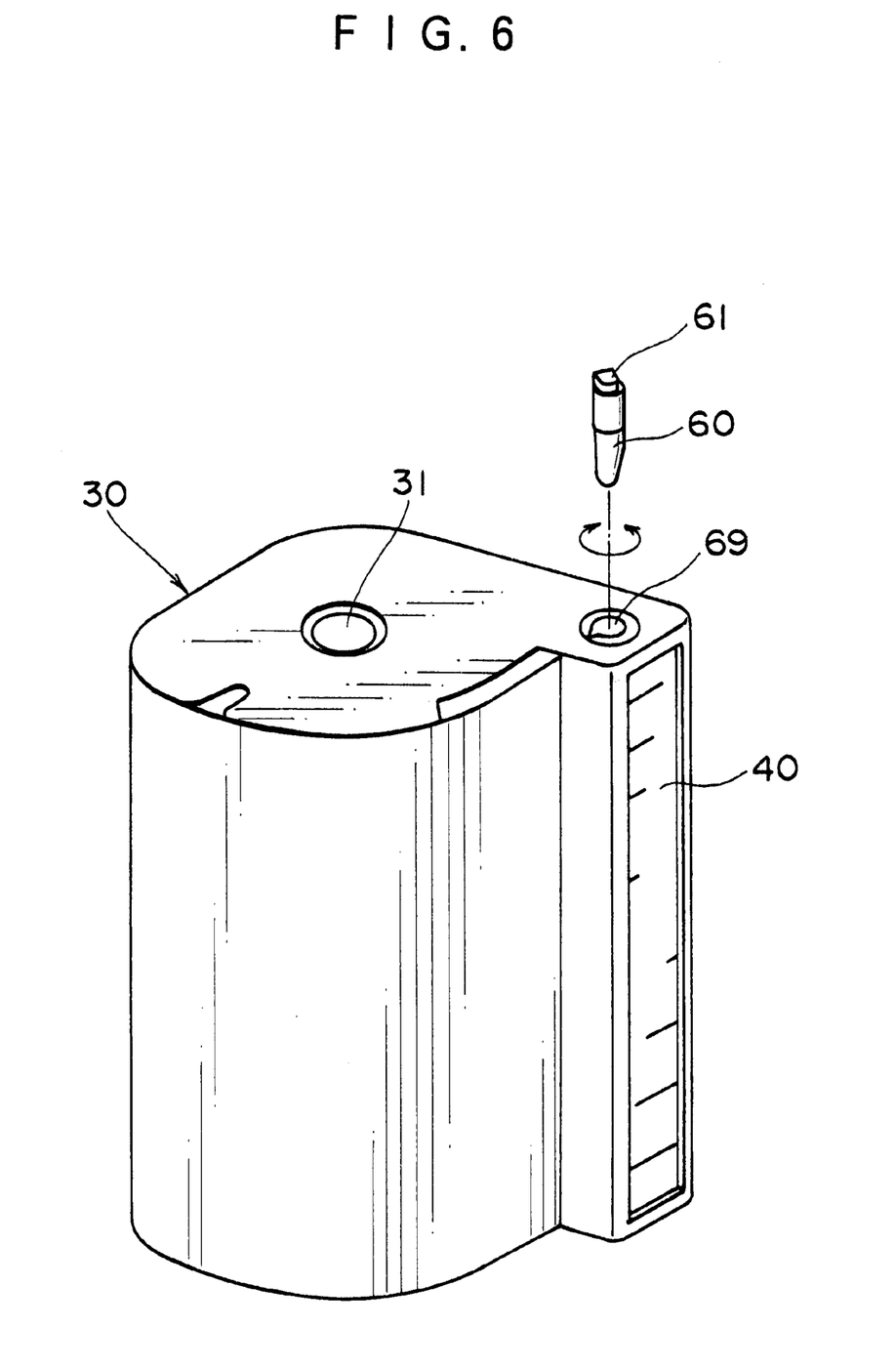
FIG. 6 is a perspective view showing a film cartridge loaded into the APS camera in FIG. 1.

When the film cartridge 30 is loaded into the film cartridge chamber 32, a light-shielding door 40 of the film cartridge 30 in FIG. 6 is opened by a light-shielding door drive mechanism 38 in FIGS. 4 and 5, and then, a 24 mm film wound in the film cartridge 30 is automatically fed from the film cartridge 30 by a feeding mechanism (not illustrated) built in the camera 10. When the leader of the fed film passes through an exposure area behind the zoom lens barrel 16 and is wound around a take-up spool 44 in a film winding chamber 42 in FIG. 1 by a predetermined amount, the feeding of the film is stopped. The take-up spool 44 winds the film by one frame every after a shutter release button 46 is pressed.

An electronic flash step-up circuit board 48 is provided above the film winding chamber 42, and an electronic flash circuit part 50 is attached to a back side of the electronic flash step-up circuit board 48. An electronic flash 52 is provided at the upper right corner of the camera body 12 in FIG. 1. The electronic flash 52 is rotatably supported on the camera body 12 through a shaft (not illustrated) so as to be retractable. When the electronic flash 52 is not used, it is stored at a storage position indicated by a solid line in FIG. 1. When the electronic flash 52 is used, it is rotated from the storage position to a using position indicated by alternate long and two short dashes lines in FIG. 1. The electronic flash 52 has an electronic flash cover 54, which is provided with a flashtube 56 and a reflector (not illustrated) holding the flashtube 56. The reflector is moved forward and backward in connection with the zooming of the zoom lens barrel 16. More specifically, the electronic flash 52 is capable of changing an illumination angle in connection with the zooming. A battery chamber is formed below and behind the electronic flash 52. A battery 58 is loaded in the battery chamber. As shown in FIG. 3, a main capacitor 59 for providing electricity to the electronic flash 52 is arranged behind the AF light receiving part 26. The main capacitor 59 is arranged laterally in a space enclosed by the AF light receiving part 26, the light-shielding door drive mechanism 38 and the camera body 12.

As shown in FIGS. 4 and 5, the light-shielding door drive mechanism 38 comprises a light-shielding door drive shaft 60; two sector gears 62, 64 for transmitting power to rotate the light-shielding door drive shaft 60; and two levers 66, 68.

The light-shielding door drive shaft 60 projects into the film cartridge chamber 32 in FIG. 1. When the film cartridge 30 in FIG. 6 is loaded into the film cartridge chamber 32, a spool 31 of the film cartridge 30 is engaged with a pin 65 projecting from the sector gear 64, and a light-shielding door drive member 69 connected to the light-shielding door 40 of the film cartridge 30 is engaged with the light-shielding door drive shaft 60. The light-shielding door 40 is always forced in a closing direction by a forcing member (not illustrated) built in the film cartridge 30. When the light-shielding door drive shaft 60 engaged with the light-shielding door drive member 69 is rotated clockwise in FIG. 6 from the state where the light-shielding door 40 is closed, the light-shielding door 40 is turned in an open direction against the force of the forcing member. Then, the film wound around the spool 31 within the film cartridge 30 can be pulled out from the film cartridge 30.

A fitting part 61 is formed at the top end of the light-shielding door drive shaft 60 as shown in FIG. 6, and the fitting part 61 is fitted into a connection hole 63 formed at the center of the sector gear 62 in FIGS. 4 and 5. Thus, the rotation of the sector gear 62 causes the light-shielding door drive shaft 60 to rotate on its axis. The light-shielding door drive shaft 60 is forced counterclockwise in FIG. 4, or clockwise in FIG. 5, by a spring 70 connected to the sector gear 62. More specifically, the spring 70 serves as a toggle spring. One end 70A of the spring 70 is hooked on a hook 62A formed on the sector gear 62, and the other end 70B of the spring 70 is hooked on a hook 72A (see FIGS. 4 and 5) formed on a base plate 72 (see FIG. 3).

The sector gear 64 is rotated in association with the spool 31 since the sector gear 64 has the pin 65, which is engaged with the spool 31 when the film cartridge 30 is loaded in the film cartridge chamber 32. For example, when the spool 31 rotates counterclockwise in FIG. 4, teeth 74 of the sector gear 64 are engaged with teeth 76 of the sector gear 62. The counterclockwise rotation of the spool 31 causes the sector gear 64 to rotate the sector gear 62 clockwise. When the force of the spring 70 exceeds a limit value, the sector gear 62 is rotated to a position shown in FIG. 5 by the force of the spring 70.

Thus, the light-shielding door drive shaft 60 connected to the sector gear 62 is rotated from the position in FIG. 4 to the position in FIG. 5, and the light-shielding door 40 of the film cartridge 30 is thereby opened. The spool 31 is rotated by a driving force of a motor built in the camera 10. Whichever directions the spool 31 is rotated in FIG. 5, the sector gear 62 is never run by the sector gear 64 since the teeth 76 of the sector gear 62 are positioned away from the teeth 74 of the sector gear 64.

The two levers 66, 68 move the sector gear 62 from the position in FIG. 5 (an open position) to the position in FIG. 4 (a closed position). The lever 66 is arranged coaxially with the sector gear 64, and it is also rotatable with respect to the sector gear 64. A pin 78 projects from the lever 66, and is fitted in a forked part 80 formed at the upper part of the lever 68. When the lever 68 is moved from the position in FIG. 5 to the position in FIG. 4, the lever 66 is pressed through the pin 78 and is rotated clockwise. The rotation of the lever 66 causes a stopper piece 82 formed in the lever 66 to come into contact with a stopper piece 84 formed in the sector gear 62. Thus, the lever 66 presses the sector gear 62. When the force of the spring 70 exceeds the limit value, the force of the spring 70 rotates the sector gear 62 to the position in FIG. 4. Thus, the light-shielding door drive shaft 60 engaged with the sector gear 62 is rotated from the position in FIG. 5 to the position in FIG. 4, and this closes the light-shielding door 40 of the film cartridge 30.

Figure 7:
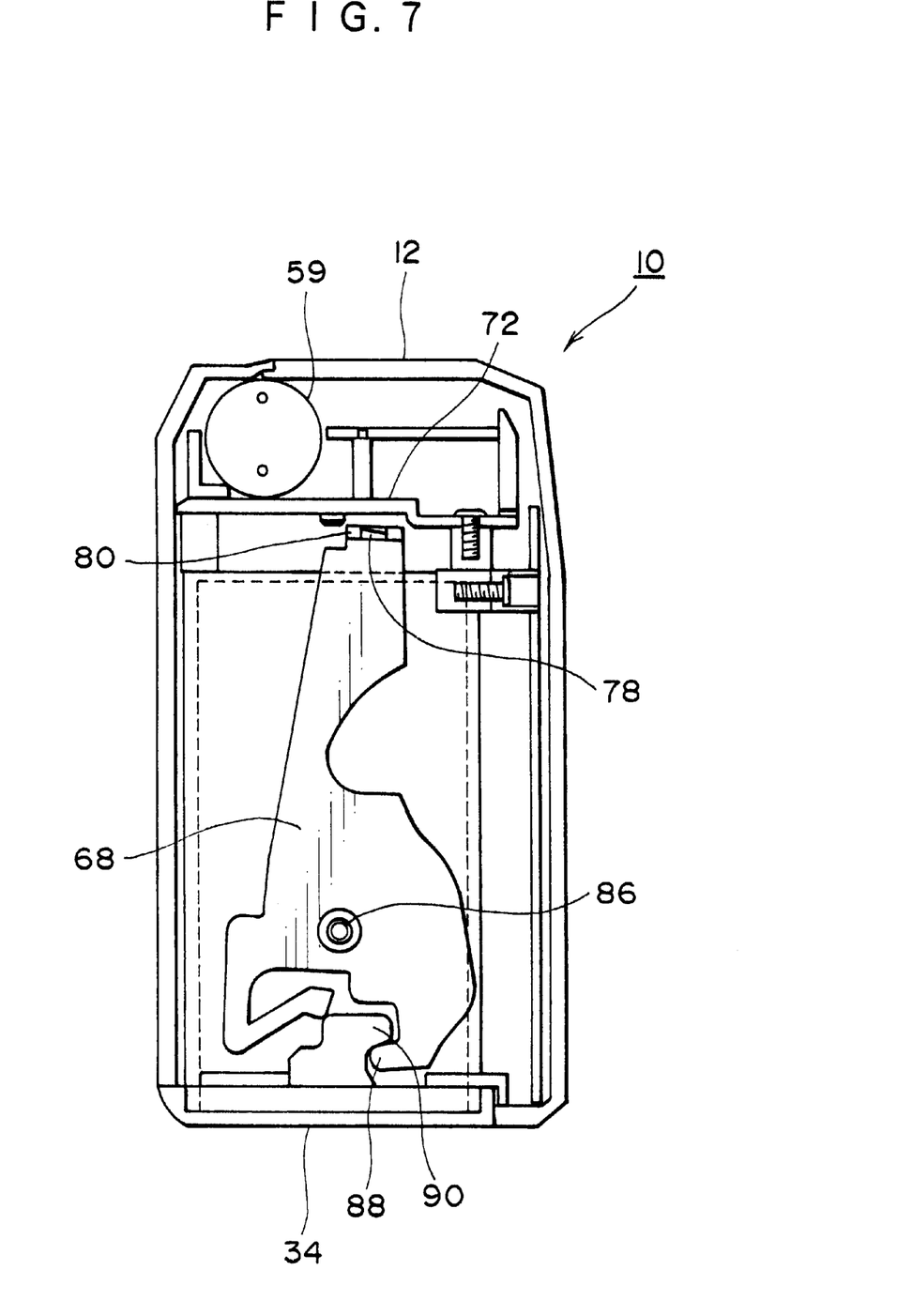
FIG. 7 is an explanation drawing showing the operation of a lever in the light-shielding door drive mechanism.
Figure 8:
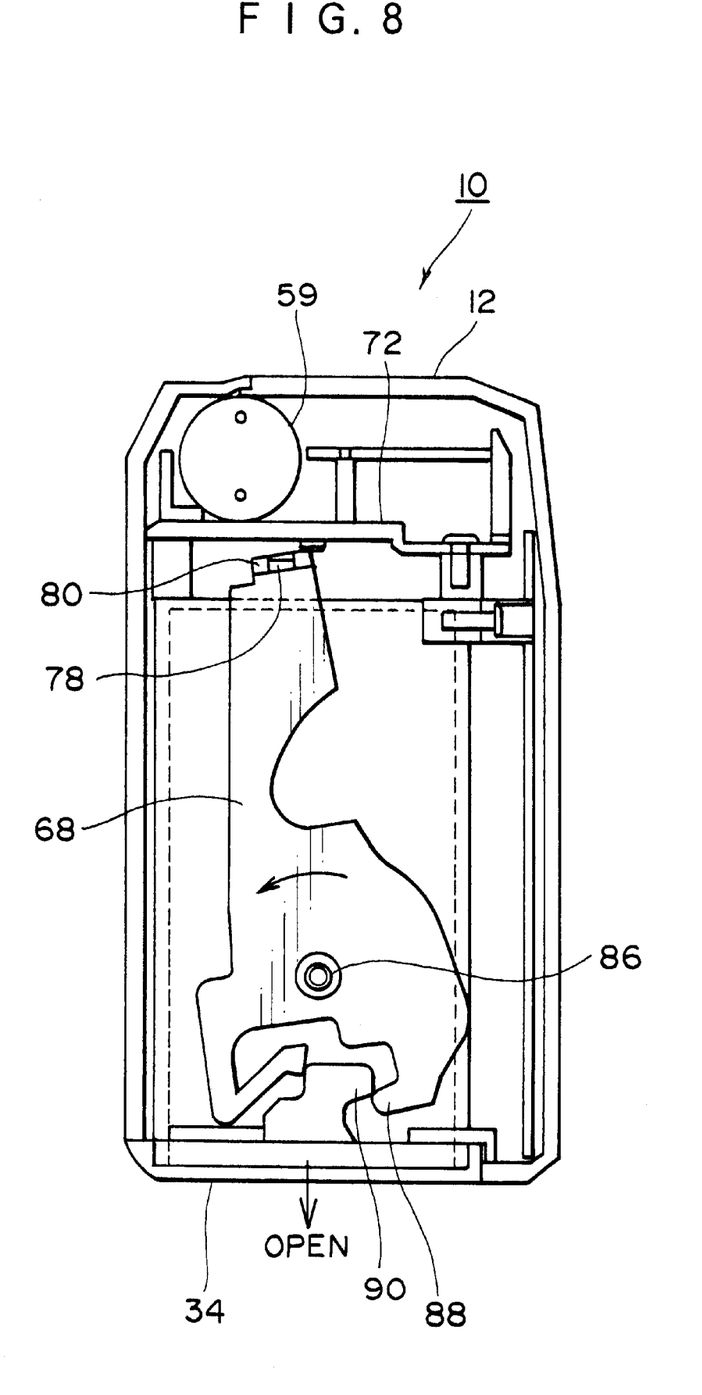
FIG. 8 is an explanation drawing showing the operation of the lever in the light-shielding door drive mechanism.

As shown in FIGS. 7 and 8, the lever 68 is arranged along the side of the camera body 12, and is swingably supported on the camera body 12 through a pin 86. A hook 88 is formed at the lower part of the lever 68, and is detachably coupled to a hook 90 formed on the lid 34. In the state where the lid 34 is closed as shown in FIG. 7, the hook 90 is coupled to the hook 88 and the lever 68 is positioned as shown in FIG. 5. As the lid 34 is opened, the hook 90 presses down the hook 88 to cause the lever 68 to rotate counterclockwise about the pin 86 by a predetermined amount as shown in FIG. 8. The position of the lever 68 in FIG. 8 corresponds to the position of the lever 68 in FIG. 4. Thus, the lever 68 is moved from the position in FIG. 5 to the position in FIG. 4 in connection with the opening action of the lid 34, and consequently, the light-shielding door 40 is closed.

A recession 94 is formed at the lower left side of a casing 92, which contains the AF light receiving part 26 as shown in FIG. 3, and a space 96 is formed between the recession 94 and the film cartridge chamber 32. The light-shielding door drive mechanism 38 is arranged in such a manner that a part thereof (a part of the sector gear 62 and a part of the spring 70) is inserted in the space 96. More specifically, the light-shielding door drive mechanism 38 is arranged by utilizing the space 96.

A description will now be given of the AF light receiving part 26 in FIG. 3 (the AF light projecting part 28 is the same as the AF light receiving part 26). In the AF light receiving part 26, a light receiving lens 98 is attached to an opening of the casing 92 and a light receiving device 102 is attached to a support 100 at the back of the casing 92. The light receiving device 102 is smaller than the light receiving lens 98, and thus, the diameter of the casing 92 is decreased from the front toward the back thereof. Thus, the recession 94 is necessarily formed at the lower left side of the casing 92 in FIG. 3. In the APS camera 10 of this embodiment, the light-shielding door drive mechanism 38 is arranged by utilizing the recession 94.

In the APS camera 10 that is constructed in the above-mentioned manner, the height of the camera body 12 in FIG. 3, in which both the light-shielding door drive mechanism 38 and the AF light receiving part 26 are arranged above the film cartridge chamber 32, is equal to the height of a comparative example of the camera body in which only the AF light receiving part would be arranged above the film cartridge chamber 32. Thus, the height of the camera body 12 is reduced, by the thickness of the light-shielding door drive mechanism 38, from a comparative example of the camera body in which the AF light receiving part 26 and the light-shielding door drive mechanism 38 are merely piled over the film cartridge chamber 32.

In the APS camera 10 of this embodiment, the AF light receiving part 26 is arranged above the film cartridge chamber 32, but the present invention should not be restricted to this. The AF light projecting part 28 may be arranged above the film cartridge chamber 32 instead of the AF light receiving part 26 and a part of the light-shielding door drive mechanism 38 may be arranged in the space 96 to be formed between the AF light projecting part 28 and the film cartridge chamber 32.

In this embodiment, the present invention is applied to the active autofocus device having the AF light receiving part 26 and the AF light projecting part 28, but the present invention may also be applied to a passive autofocus device having a pair of light receiving parts without any light projecting part. In this case, one light receiving part is arranged above the film cartridge chamber 32 and a part of the light-shielding door drive mechanism 38 is arranged in the space 96 between a recession formed at the one light receiving part and the film cartridge chamber 32. Thus, the base line length between the two light receiving parts can be long without increasing the size of the camera.

As set forth hereinabove, one member of the light projecting part and the light receiving part, or one member of the pair of light receiving parts, of the autofocus device is arranged above the film cartridge chamber, and the part of the light-shielding door drive mechanism is arranged by utilizing the space between the recession formed at the bottom of the one member and the film cartridge chamber. Thus, the base line length of the autofocus device can be long without increasing the size of the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:

a camera body;

a film cartridge chamber formed in the camera body, the film cartridge chamber housing a film cartridge provided with a light-shielding door;

a film winding chamber formed in the camera body, the film winding chamber having a take-up spool winding a photographic film fed from the film cartridge housed in the film cartridge chamber;

an autofocus device arranged in the camera body, the autofocus device having a light projecting part and a light receiving part to measure an object distance; and a light-shielding door drive mechanism which opens and closes a light-shielding door of the film cartridge housed in the film cartridge chamber, wherein:

one of the light projecting part and the light receiving part of the autofocus device is arranged above the film cartridge chamber, the one of the light projecting part and the light receiving part being held in position by a supporting structure, the supporting structure having a recession formed at a bottom thereof; and at least a part of the light-shielding door drive mechanism is arranged between the film cartridge chamber and the recession of the supporting structure of the one of the light projection part and the light receiving part.

2. A camera comprising:

a camera body;

a film cartridge chamber formed in the camera body, the film cartridge chamber housing a film cartridge;

a film winding chamber formed in the camera body, the film winding chamber having a take-up spool winding a photographic film fed from the film cartridge housed in the film cartridge chamber;

an autofocus device arranged in the camera body, the autofocus device having two light receiving parts to measure an object distance; and a light-shielding door drive mechanism which opens and closes a light-shielding door of the film cartridge housed in the film cartridge chamber, wherein:

one of the two light receiving parts of the autofocus device is arranged above the film cartridge chamber, the one of the two light receiving parts being held in position by a supporting structure, the supporting structure having a recession formed at a bottom thereof; and at least a part of the light-shielding door drive mechanism is arranged between the film cartridge chamber and the recession of the supporting structure of the one of the two light receiving parts.

* * * * *